United States Patent Office 3,197,518
Patented July 27, 1965

3,197,518
INTERCONVERSION OF HYDROCARBON RING
COMPOUNDS
Duane K. Chapman and George J. Rozman, Ashland, Ky.,
assignors to Ashland Oil & Refining Company, Ashland,
Ky., a corporation of Kentucky
No Drawing. Filed Apr. 4, 1962, Ser. No. 184,933
23 Claims. (Cl. 260—668)

This invention relates to a process for the conversion of monocyclic and polycyclic hydrocarbon compounds to structurally different, non-homologous ring compounds. In one aspect, the invention is directed to the interconversion of polycyclic compounds including indane, tetrahydronaphthalene, biphenyl, acenaphthene, phenanthrene and anthracene into polycyclic compounds of different structure as well as into simpler aromatics such as benzene and naphthalene. In another aspect, the process of this invention relates to the production of relatively more complex or higher boiling ring compounds from relatively simpler ring compounds, for example, for converting hydrocarbon ring compounds boiling at temperatures lower than the boiling point of phenanthrene into more complex higher boiling ring compounds including phenanthrene, anthracene, beta phenylnaphthalene and a number of other branched, fused or alkylated polycyclic compounds boiling in the 600° F.+ range.

As a group, the type of conversions effected by this process are to be distinguished from the general categories of organic conversions taking place in conventional reforming, alkylation, isomerization, polymerization, cracking and de-alkylation processes, although probably some of the same reaction mechanisms are present to a degree. Thus, generally speaking, reforming processes involve the dehydrogenation and cyclization of aliphatic materials to aromatic compounds, alkylation and de-alkylation involve respectively the addition to and removal of alkyl groups from either aliphatics or aromatics, isomerization involves the conversion of hydrocarbon compounds to different hydrocarbon compounds having the same empirical formula, cracking involves the splitting of relatively complex compounds into simpler compounds, and polymerization is the production of more complex compounds from simpler ones by chemical interlinkage. In contrast, the present process relates to the re-arrangement of aromatic molecules to form other aromatics which are basically different from them. As presently understood, the conversions effected by the process of this invention apparently cannot be categorized as coming within any of these previously known general types of conversion processes, yet some of the reactions characteristic of all of these types of conversions occur in this process.

Simply stated, this invention is predicated on the empirical discovery and determination that a large number of conversions of hydrocarbon ring compounds to structurally different, non-homologous ring structures can be made to take place in the presence of chromia-alumina catalysts in a hydrogenating atmosphere at temperatures in the range of about 1200°–1400° F.

The catalyst which we prefer to utilize in the process of this invention to effect the interconversion of hydrocarbon ring compounds comprises a high purity, low sodium content gamma type alumina support on which is deposited about 5 to 25% by weight chromium oxide. Catalysts in which the aforementioned sodium content is less than about 2% by weight and in which the chromium oxide is present in an amount in the range of about 10–15% may be used. The chromia is preferably present in form of hexagonal crystals. However, it should be noted that the use of other catalysts of the chromia-on-alumina type are within the scope of the invention.

The type of reactions which we have found to take place in the presence of chromia on alumina catalysts at the given conditions are extremely varied and complex. No one mechanism seems to predominate, and typically a range of different products is formed even from a pure feed stock. Some of the reaction products are formed in relatively large quantities, while others are formed in small quantities, for example, to the extent of 1% or less.

The charts on the following pages illustrate some of the fundamental interconversions of polycyclic hydrocarbons which we have found can be effected by means of this process.

Acenaphthene $\xrightarrow{H_2 \quad H_2}$ Naphthalene / Mixed methylnaphthalenes / Mixed dimethylnaphthalenes / Phenanthrene / Polymers Fluorene $\xrightarrow{H_2}$ Naphthalene / Biphenyl / Mixed methylnaphthalenes / Mixed dimethylnaphthalenes / Phenanthrene / Polymers

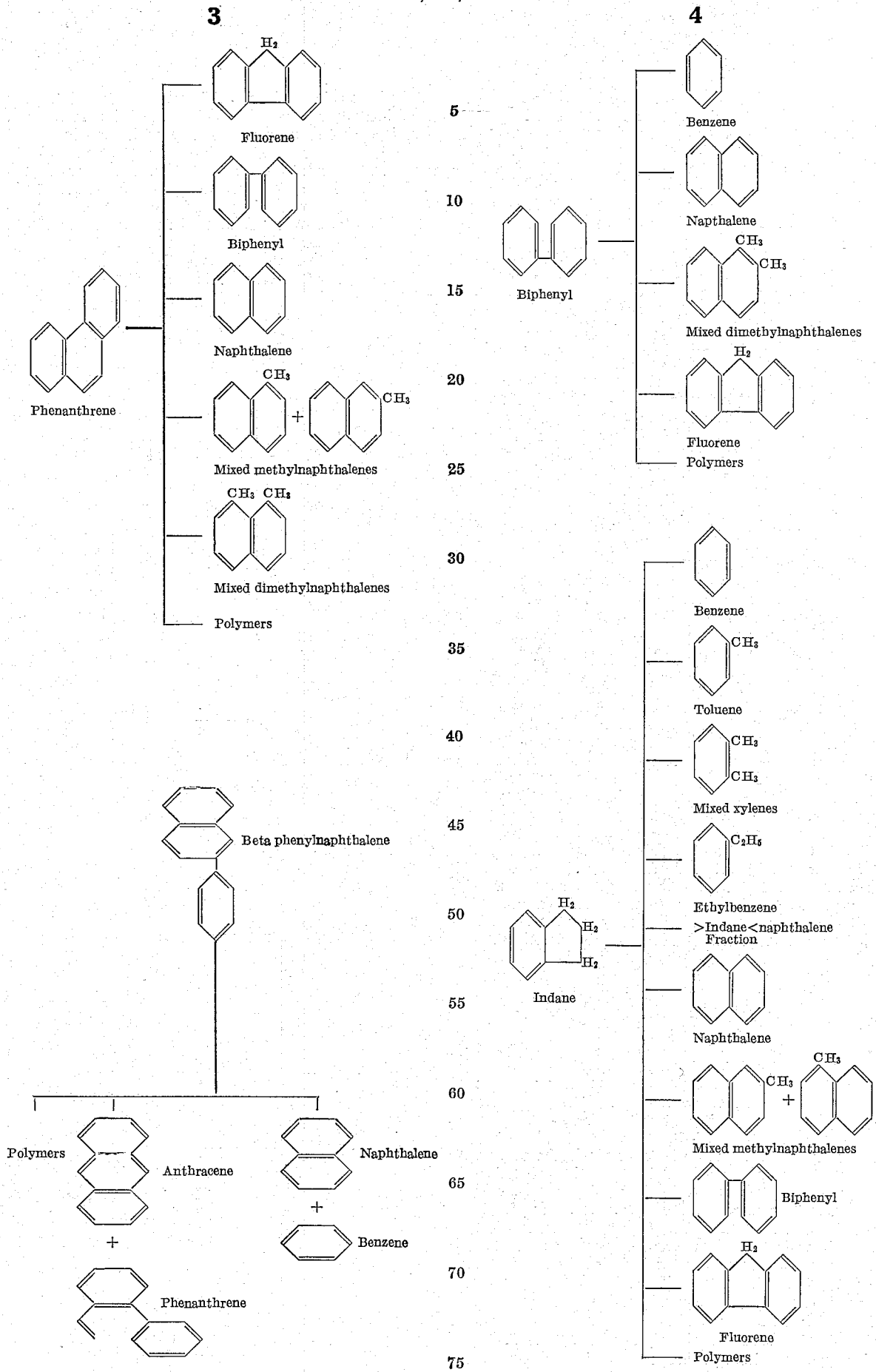

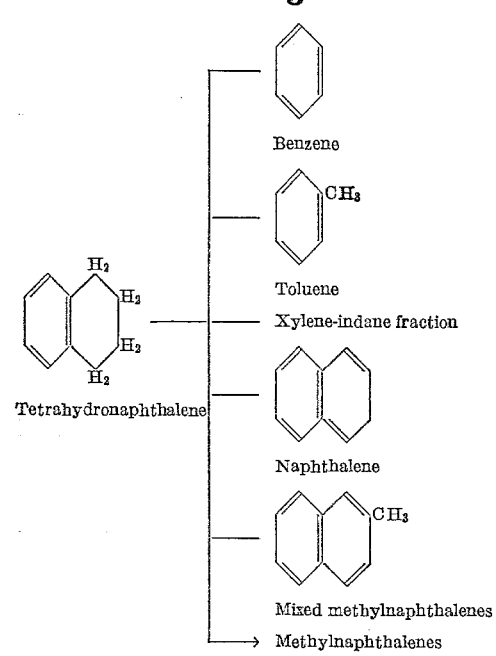
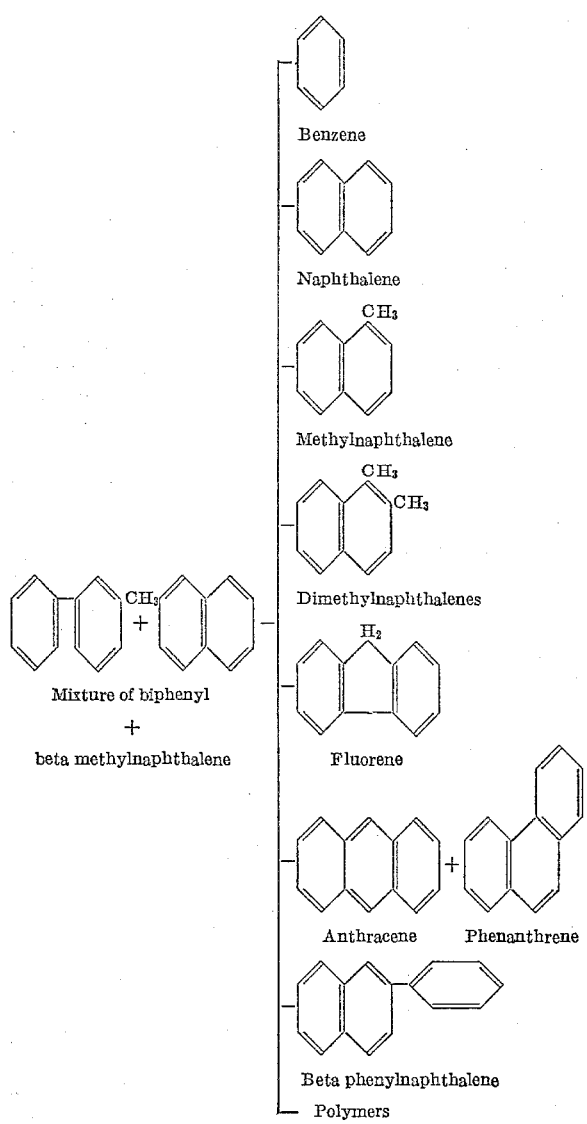

For reference, the boiling points of some of these polynuclear compounds are as follows:

|  | °F. |
|---|---|
| Indane | 350 |
| Tetrahydronaphthalene | 403 |
| Naphthalene | 424 |
| Beta methylnaphalene | 466 |
| Alpha methylnaphthalene | 473 |
| Biphenyl | 491 |
| Acenaphthene | 530 |
| Fluorene | 566 |
| Phenanthrene | 643 |
| Anthracene | 646 |
| Beta phenylnaphthalene | 658 |

It is a highly empirical result that such varied conversions, especially of pure feed stocks, can be effected. It can readily be seen that no simple mechanism will account for the formation of such varied products from the feeds. In several instances illustrated on these charts it does appear, however, that fused ring hydrocarbons such as acenaphthene, indane and fluorene apparently lose methylene groups by ring rupture, and in some instances by recylization, to form the next lower molecular weight fused ring structures. In general, the reactions are not complete, and equilibria exist such that higher molecular weight structures are formed from simpler structures, as well as the reverse reactions. In part, biphenyl and beta phenylnaphthalenes lose two carbons and recyclize, forming naphthalene in the former case and anthracene in the latter case. Some of the methylene carbons contribute to the formation of methyl and di-methyl naphthalenes. Mixtures such as biphenylmethylnaphthalene undergo conversions involving isomerization, disproportionation and transalkylation. In the case of indane, naphthalene and methylnaphthalenes are formed in part, apparently through ring rupture, alkylation and cyclization. Due to the opposite nature of some of the pairs of over-all reactions taking place it is not feasible to guess what radicals and reaction mechanisms are actually involved.

Table I following exemplifies the operating details of typical or representative conversions of various feed stocks in accordance with the process we have discovered. In some instances the feeds melted at temperatures so high as to make it inconvenient to handle the liquid material in the laboratory, and the material was dissolved in benzene to render it more easily contractable with the catalyst. In all cases the conversions were effected over a catalyst comprising 14.0% chromia on a high purity gamma alumina support. The products of each test were analyzed by gas chromatography. This table does not purport to show all the minor components formed. The yields given are based on 100% of charge, ignoring losses of products.

The following abbreviations are used in Table I:

AcN—acenaphthene
AMN—alpha methylnaphthalene
An—anthracene
B—Benzene
BiPh—biphenyl
BMN—beta methylnaphthalene
DMN—dimethylnaphthalene
FL—fluorene
I—indane
N—naphthalene
Ph—phenanthrene
PhN—phenylnaphthalene
T—toluene
X—xylene

TABLE I

| Test Number | N-260 | N-266 | N-268 | N-269 | N-271 | N-272 | N-273 | N-274 | N-275 | N-276 |
|---|---|---|---|---|---|---|---|---|---|---|
| Feed Stock | 32 AcN 68 B | 26 Fl 74 B | 25 Ph 75 B | 25 PhN 75 B | BiPh | Ind. | 33 BiPh 67 BMN | B | Ph | 50 T 50 BMN |
| Operating Conditions: | | | | | | | | | | |
| WHSV | 0.73 | 0.75 | 0.67 | 0.65 | 0.82 | 0.78 | 0.80 | 0.71 | 0.75 | 0.70 |
| Temperature, °F | 1,325 | 1,350 | 1,335 | 1,330 | 1,325 | 1,325 | 1,340 | 1,335 | 1,325 | 1,335 |
| Pressure, p.s.i.g | 500 | 500 | 500 | 500 | 500 | 500 | 500 | 500 | 500 | 500 |
| $H_2/HC$ | 5.8/1 | 4/1 | 5.3/1 | 5.6/1 | 7.5/1 | 6.3/1 | 5/1 | 5.4/1 | 7/1 | 7.1/1 |
| Liquid Yield, Wt. Percent | 87.3 | 93.5 | 93.8 | 93.2 | 88.7 | 61.6 | 80.8 | 72.4 | 86.4 | 70.4 |
| Benzene in Gas, Wt. Percent | 4.5 | 2.2 | 3.5 | 4.8 | 2.6 | | 2.2 | 2.0 | 1.8 | 3.4 |
| Total Yield, Wt. Percent | 91.8 | 95.7 | 97.3 | 98.0 | 91.3 | | 83.0 | 74.4 | 88.2 | 73.8 |
| Chromatographic Analyses—Composite: | | | | | | | | | | |
| B | 64.0+ | 74.0+ | 72.5+ | 78.8+ | 79+ | 24.5+ | 31.5+ | 95.5 | | 28.4+ |
| T | | | | | | 28.1 | | | 2.0+ | 5.3 |
| X | | | | | | 2.7 | | | | 1.3 |
| >X<I | | | | | | 3.1 | | | 0.4 | |
| I | | | | | | 11.9 | | | | |
| >I<N | | | | | | 12.3 | | | | |
| N | 16.2 | 1.8 | 1.0 | 13.5 | 1.7 | 8.6 | 51.1 | | 5.0 | 56.4 |
| BMN | 0.3 | 0.1 | | | 0.1 | 0.5 | 0.8 | | 0.5 | 4.9 |
| AMN | | | | | | 0.3 | 0.1 | | 0.1 | |
| BiPh | 1.3 | 5.0 | 2.8 | 4.2 | 13.3 | 1.5 | 1.7 | 4.5 | 0.2 | 2.6 |
| DMN | 1.7 | 0.1 | | | 0.7 | | 0.1 | | 1.7 | |
| AcN | 7.5 | 0.1 | | | 0.2 | 0.3 | | | | |
| Fl | | 13.7 | 2.7 | 0.1 | 0.3 | 0.9 | 0.3 | | 11.4 | 0.2 |
| >Fl<Ph | | | | 0.1 | 0.3 | 0.7 | 0.1 | | 1.7 | |
| Ph | 0.1 | | 17.9 | 0.3 | | 0.8 | 1.6 | | 65.7 | 0.4 |
| An | | | | 0.4 | | | | | | |
| >An<PhN | | | | | | 2.8 | | | | |
| PhN | 0.2 | | | 1.5 | | | 2.0 | | | 0.5 |

This data demonstrates the possibility of obtaining various mono- and polynuclear hydrocarbon ring compounds from different feeds. Although the table illustrates the conversion of pure or two-component feeds, in practice the feed might also comprise various mixtures containing ring compounds and having an end boiling point in the 500–700° F. range. As far as we know, it has not heretofore been possible to effect the conversions of polynuclear hydrocarbon compounds, at least on such a broad basis, by means of a single, essentially simple processing step.

The various components of the reaction mixture can be separated from each other by appropriate conventional techniques, including fractionation, fractional crystallization, extraction, and other techniques or combinations thereof, to yield the components in pure form.

In the conversions of many if not most tricyclic and bicyclic compounds hereunder, naphthalene is produced in substantial quantities. For example, when acenaphthene is subjected to conversion in accordance with this process, the naphthalene yield is roughly about 50% of the acenaphthene feed; in the case of fluorene, naphthalene yield is about 5–10% of fluorene feed. It will thus be seen that, in addition to producing other polycyclic compounds, this process provides a method for at least partly converting various unalkylated high boiling saturated and unsaturated compounds into naphthalene. Moreover, where the feed includes biphenyl, a large proportion of benzene is produced.

High boiling (i.e. having an end boiling point above about 500° F.) complex mixtures of aromatics are produced in substantial quantities in many petroleum refining operations, including reforming, cracking, and others. Because of their highly complex composition such mixtures have heretofore been of relatively little value. By means of this process it is possible to convert these mixtures of complex fused ring aromatics at least in part to simpler, less complex aromatic structures of higher value which, on account of their more widely separated boiling points, can readily be separated by fractionation.

As previously suggested, the process we have discovered is not limited to conversions of polycyclic aromatics alone, or mixtures thereof. We have also found, surprisingly, that if relatively simple, low boiling aromatics are present in the feed at the same general operating conditions, there also or simultaneously occurs the conversion of these simpler aromatics to more complex polycyclics, which may be fused, branched or alkylated.

Thus, with reference to Table I, test N-272 shows for example that indane is in part converted to heavier compounds including but not limited to naphthalene, alpha and beta methylnaphthalenes, biphenyl, and fluorene. As shown in test N-274, benzene is converted in part to biphenyl; in test N-271, biphenyl is converted in part to acenaphthene, fluorene and other more complex materials. While in general most reaction equilibria in the conversions of this process lie toward the side of the simpler, more stable compounds, proportions of more complex materials are formed at the same time. Depending on the changing demands for the different reaction products, it is expected that this process will be of practical utility, at least in some instances, for producing more complex materials from relatively low boiling feeds. It is probably possible to further improve the yields of heavier materials from lighter materials by adjusting process parameters. The surprising thing is that such products are formed at all, especially at the same time lighter products are formed.

It should be noted that both unsaturated and saturated, or partly saturated, ring compounds can be converted by this process. Test N-260, for example, shows that acenaphthene, which is partly saturated, is converted into various unsaturated aromatics. Tests N-266, relating to fluorene, and N-272, relating to indane, illustrate the conversion of other partly saturated materials. As previously indicated, tetrahydronaphthalene can be converted by this process to mono- and bicyclic aromatics. A typical example of such a conversion is as follows.

*Conversion of tetralin over chromia-alumina catalyst*

| | |
|---|---|
| Feed | 1,2,3,4-tetrahydronaphthalene. |
| WHSV | 0.65. |
| Temperature | 1350° F. |
| Pressure | 500 p.s.i.g. |
| $H_2/HC$ | 7/1. |
| Liquid yield | 64.3% by weight. |

| Product analysis: | Wt. percent |
|---|---|
| Benzene | 31.8 |
| Toluene | 4.0 |
| Xylenes to indane fraction | 4.6 |
| Naphthalene | 57.3 |
| Methylnaphthalenes | 1.2 |
| Heavier than methylnaphthalene | 1.1 |

Table II illustrates some of the fundamental types of conversions which take place when the feed to the reaction zone comprises a heavy catalytic reformate having an ASTM end boiling point of about 600° F.

TABLE II

| Component | Feed, Wt. Percent | Test No. | |
|---|---|---|---|
| | | N-277 (1,335° F.) Wt. percent on Feed | N-277A (1,375° F.) Wt. percent on Feed |
| Lower Boiling than Phenanthrene | 100.0 | | |
| Phenathrene | 0.0 | 0.2 | 0.3 |
| Anthracene | 0.0 | 0.1 | 0.1 |
| Anthracene to Beta Phenylnapthalene | 0.0 | 0.1 | 0.2 |
| Beta Phenylnaphthalene | 0.0 | 0.2 | 0.3 |

The table shows that although the feed contained no phenanthrene or higher boiling compounds, the product stream contained small but significant quantities of phenanthrene, anthracene, beta phenylnaphthalene and higher boiling compounds, in addition to compounds boiling lower than phenanthrene.

Apparently a large number of polycyclics and polymers boiling in the 700° F.+ range are formed in this process. Many of these components have not yet been identified. Table III is a compilation of the results of a gas chromatographic analysis of the liquid product obtained by subjecting a heavy reformate feed to such conversion, indicating the presence of these unidentified compounds, which are designated as "x."

TABLE III

| Component | Retention time in gas chromatograph analysis, min. | Conc. LV, percent |
|---|---|---|
| x | 3.3 | 0.6 |
| x | 3.4 | 0.8 |
| x | 3.5 | 0.5 |
| x | 3.6 | 0.4 |
| Naphthalene | 3.7 | 63.0 |
| 2-methylnaphthalene | 4.2 | 10.8 |
| 1-methylnaphthalene | 4.3 | 6.0 |
| x | 4.6 | 2.4 |
| x | 4.7 | 3.1 |
| x | 4.9 | 1.1 |
| x | 5.1 | 0.4 |
| x | 5.3 | 0.7 |
| Acenaphthene | 5.8 | 1.4 |
| Fluorene | 7.3 | 1.7 |
| x | 9.3 | 0.2 |
| x | 9.4 | 0.2 |
| x | 9.8 | 0.1 |
| Phenanthrene | 13.9 | 1.6 |
| Anthracene | 14.3 | 1.1 |
| x | 15.3 | 0.5 |
| x | 18.5 | 0.3 |
| x | 19.2 | 0.3 |
| x | 19.7 | 0.2 |
| x | 20.2 | 0.2 |
| Beta phenylnaphthalene | 24.3 | 1.2 |
| x | 33.5 | 0.2 |
| x | 36.0 | 0.2 |
| x | 42.6 | 0.1 |
| x | 44.8 | 0.2 |
| x | 61.6 | 0.2 |
| x | 64.0 | 0.2 |

The chromia-alumina catalysts used in the process can be prepared in accordance with known techniques. The following is an analysis of one catalyst of the type which we prefer to use to accomplish the conversions of this process.

*Analysis of catalyst*

Chemical analysis:           Weight percent
- $Cr_2O_3$ _____ 11.8–12.4
- Iron _____ 0.008
- Manganese _____ 0.004
- Nickel _____ 0.02
- Vanadium _____ 0.01
- Lead _____ 0.004
- Tin _____ 0.03
- Copper _____ 0.01
- Magnesium _____ 0.06
- Calcium _____ 0.3
- Sodium _____ 0.2
- Molybdenum _____ 0.03
- Silicon _____ 0.04
- Gallium _____ 0.01
- $Al_2O_3$ (gamma type by X-ray diffraction), major component.

Physical properties:
- Surface area (square meters gram) _____ 174
- Pore volume (cc./gram) _____ 0.193
- Pore diameter (angstroms) _____ 44

The catalyst can be in the form of tablets, for example 3/16" x 3/16", forming a fixed bed through which the feed stock and hydrogen are passed continuously. However, other tablet sizes may of course be used, as may multiple fixed bed or moving bed reactor systems. Pulverized catalyst may be employed in a fluidized type reactor.

The conversion is effected by contacting the feed with the catalyst and hydrogen at a temperature above 1200° F., e.g. 1340°–1390° F., and preferably about 1350° F. The production of benzene and naphthalene tend to increase with temperature, and above 1400° F. undesirable cracking to lighter products begins to occur. The process is conducted at a pressure of about 100 to 1000 p.s.i. The hydrogen to hydrocarbon ratio may be in the range of 3:1 to 10:1 and is preferably about six or seven to one. We have found that low space velocities, e.g. 0.5–0.9, tend to improve yields of polycyclics. Higher space velocities up to about 2.0 tend to effect larger production of benzene and naphthalene. Coking will vary with the feed but in general is extremely small.

What is claimed is:

1. A method of converting polycyclic hydrocarbon compounds, comprising subjecting a feed containing at least one polycyclic hydrocarbon compound selected from the group consisting of acenaphthene, anthracene, biphenyl, fluorene, indane, phenanthrene, phenylnaphthalene and tetrahydronaphthalene to conversion in the presence of hydrogen and a catalyst comprising chromia on alumina at a temperature of about 1200° to 1400° F., a pressure of about 100 to 1000 p.s.i. and a weight hourly space velocity of about 0.5 to 2.0.

2. The method of claim 1 wherein said catalyst contains 5–25% by weight chromia on said alumina.

3. The method of claim 2 wherein said alumina is gamma alumina.

4. The method of claim 2 wherein said gamma alumina is of high purity and has a sodium content of less than about 2% by weight.

5. The method of claim 2 wherein said conversion is conducted at a temperature of about 1340–1390° F.

6. The method of claim 5 wherein said conversion is conducted at a weight hourly space velocity of about 0.5–0.9.

7. The method of synthesizing polycyclic hydrocarbon ring compounds comprising subjecting a petroleum catalytic reformate having an end boiling point in the range of about 500–700° F. to conversion in the presence of hydrogen and a catalyst which comprises 5–25% by weight chromia on an alumina support at a temperature of about 1200–1400° F., a weight hourly space velocity of about 0.5—2.0, and a pressure of about 100–1000 p.s.i.

8. The method of claim 7 wherein said alumina support is high purity gamma alumina having a sodium content less than about 2% by weight.

9. The method of claim 7 wherein said catalyst comprises about 10–15% chromia on said support.

10. The method of claim 7 wherein said chromia is in the form of hexagonal crystals.

11. The method of claim 7 wherein said weight hourly space velocity is about 0.5–0.9.

12. The method of claim 7 wherein a hydrogen to hydrocarbon ratio of about 3:1 to 10:1 is used.

13. The method of claim 7 wherien said reformate has an end boiling point below the boiling points of the polycyclic compounds which are synthesized by said method.

14. A method of converting polycyclic hydrocarbon compounds, comprising subjecting a feed containing at least one polycyclic hydrocarbon compound selected from the group consisting of acenaphthene, anthracene, biphenyl, fluorene, indane, phenanthrene, phenyl naphthalene and tetrahydronaphthalene to conversion in the presence of hydrogen and a catalyst which comprises about 10–15% by weight of chromia on a gamma alumina support of high purity containing less than 2% by weight of sodium, at a hydrogen to hydrocarbon ratio of about 3:1 to 10:1, a temperature of about 1340°–1390° F., a pressure of about 100 to 1000 p.s.i. and a weight hourly space velocity of about 0.5 to 2.0.

15. A method in accordance with claim 14 wherein said weight hourly space velocity is about 0.5 to 0.9.

16. A method in accordance with claim 14 wherein said polycyclic hydrocarbon compound is acenaphthene.

17. A method in accordance with claim 14 wherein said polycyclic hydrocarbon compound is anthracene.

18. A method in accordance with claim 14 wherein said polycyclic hydrocarbon compound is biphenyl.

19. A method in accordance with claim 14 wherein said polycyclic hydrocarbon compound is fluorene.

20. A method in accordance with claim 14 wherein said polycyclic hydrocarbon compound is indane.

21. A method in accordance with claim 14 wherein said polycyclic hydrocarbon compound is phenanthrene.

22. A method in accordance with claim 14 wherein said polycyclic hydrocarbon compound is phenylnaphthalene.

23. A method in accordance with claim 14 wherein said polycyclic hydrocarbon compound is tetrahydronaphthalene.

References Cited by the Examiner

UNITED STATES PATENTS

| | | | |
|---|---|---|---|
| 2,232,761 | 2/41 | Balthis | 260—674 X |
| 2,414,118 | 1/47 | Orchin | 260—668 |
| 2,420,143 | 5/47 | Mattox | 260—668 |
| 2,526,895 | 10/50 | Pines et al. | 260—668 |
| 2,531,328 | 11/50 | Elwell | 260—668 |
| 2,653,176 | 9/53 | Beckberger | 260—672 |
| 2,658,089 | 11/53 | Ipatieff et al. | 260—668 |
| 2,775,629 | 12/56 | Anderson | 260—668 |

ALPHONSO D. SULLIVAN, *Primary Examiner.*

UNITED STATES PATENT OFFICE
CERTIFICATE OF CORRECTION

Patent No. 3,197,518

July 27, 1965

Duane K. Chapman et al.

It is hereby certified that error appears in the above numbered patent requiring correction and that the said Letters Patent should read as corrected below.

Column 2, at the bottom of the formula, about line 70, for "Phenanthrene" read -- Acenaphthene --; column 6, line 51, for "contractable" read -- contactable --; column 9, TABLE II, first column, line 3 thereof, for "Phenathrene" read -- Phenanthrene --.

Signed and sealed this 10th day of May 1966.

(SEAL)
Attest:

ERNEST W. SWIDER
Attesting Officer

EDWARD J. BRENNER
Commissioner of Patents